(12) United States Patent
Fukuzawa et al.

(10) Patent No.: US 7,284,523 B2
(45) Date of Patent: Oct. 23, 2007

(54) ARRANGEMENT STRUCTURE OF STARTER MOTOR

(75) Inventors: Sumiko Fukuzawa, Saitama (JP);
Takashi Shichinohe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 11/149,142

(22) Filed: Jun. 10, 2005

(65) Prior Publication Data
US 2005/0274346 A1 Dec. 15, 2005

(30) Foreign Application Priority Data
Jun. 15, 2004 (JP) ............................. 2004-177077

(51) Int. Cl.
*F02N 11/00* (2006.01)
*B62K 5/00* (2006.01)
(52) U.S. Cl. ................................. 123/179.25
(58) Field of Classification Search .......... 123/179.25, 123/179.26, 192.1; 74/7 E
See application file for complete search history.

(56) References Cited

U.S. PATENT DOCUMENTS 4,960,081 A  10/1990  Atsuumi 6,305,337 B1 * 10/2001 Sumi et al. ............ 123/179.25
6,848,406 B2 *  2/2005 Ibukuro et al. ........ 123/179.25
2002/0033295 A1  3/2002 Korenjak et al.

FOREIGN PATENT DOCUMENTS

| JP | 4-276183 | 10/1992 |
| JP | 9-228850 | 9/1997 |
| JP | 10-121933 A | 5/1998 |
| JP | 3261966 B2 | 12/2001 |

* cited by examiner

*Primary Examiner*—Stephen K. Cronin
*Assistant Examiner*—Arnold Castro
(74) *Attorney, Agent, or Firm*—Birch, Stewart, Kolasch & Birch, LLP

(57) ABSTRACT

An arrangement structure of a starter motor in an all-terrain vehicle in which a minimum road clearance is secured sufficiently and lowering of the center of gravity and adequate weight distribution of the vehicle can be achieved. The starter motor is arranged in an area at the front portion of the vehicle with respect to a vertical line including a center point of a crankshaft of an engine, downwardly of a horizontal line including the center point of the crankshaft of the engine, and upwardly of a horizontal line including a lowermost portion of the crankcase of the engine in the vehicle.

18 Claims, 9 Drawing Sheets

ARRANGEMENT STRUCTURE OF STARTER MOTOR

CROSS-REFERENCE TO RELATED APPLICATION

The present application claims priority under 35 U.S.C. §119 to Japanese Patent Application No. 2004-177077, filed Jun. 15, 2004, the entire contents of which are hereby incorporated by reference.

BACKGROUND OF THE INVENTION

1. Field of the Invention

The present invention relates to an arrangement structure of a starter motor in an all-terrain vehicle.

2. Description of Background Art

In general, a vehicle suitable for traveling on all-terrain such as a three-wheel buggy or a four-wheel buggy, for example, an all-terrain vehicle (hereinafter referred to as ATV) is well known. Such a vehicle is typically provided with a front wheel shaft and a rear wheel shaft provided at the front and rear of a vehicle frame, a front wheel and a rear wheel provided on the front wheel shaft and the rear wheel shaft, an engine provided between the front wheel shaft and the rear wheel shaft, a saddle-type seat provided on the upper portion of the vehicle frame, a bar-shaped handle provided in front of the saddle-type seat and supported by the vehicle frame, and a foot-rest disposed between the front wheel shaft and the rear wheel shaft and disposed on the vehicle frame.

The vehicle of this type has a design in which a minimum road clearance is sufficiently secured and a weight distribution of the vehicle is considered, so that it can travel on all terrain.

In the structure described above, a starter motor is provided for enabling the user to start the engine in a state of being seated on the saddle-type seat. The starter motor is normally arranged behind the engine and in an upper portion of an crankcase (For Example, Patent Document No. JP-A-10-121933).

On the other hand, although it is not the ATV having the structure described above, a motorcycle having the starter motor for the engine on the front side of the vehicle with respect to a vertical line including a center point of a crankshaft of the engine and downwardly of the horizontal line including the center point of the crankshaft of the engine is proposed (for example Japanese Patent Document No. 3261966).

However, in Japanese Patent Document No. JP-A-10-121933, since the starter motor is arranged in the upper portion of the crankcase, the position of the center of gravity of the engine is high, which leaves a problem in adjustment of the weight distribution of the ATV. On the other hand, in Japanese Patent Document No. 3261966, since the starter motor is disposed downwardly of the center point of the crankshaft, better adjustment of the position of the center of gravity is achieved However, in Japanese Patent Document No. 3261966, since an oil filter, which is lighter than the starter motor, is located below the starter motor, the position of the center of gravity of the engine becomes inevitably high, which also leaves a problem in adjustment of the weight distribution.

SUMMARY AND OBJECTS OF THE INVENTION

Accordingly, it is an object of the present invention to solve the problems in the related art described above, and to provide an arrangement structure of a starter motor in which lowering of the center of gravity and a suitable weight distribution are achieved in an ATV while securing a sufficient minimum road clearance.

The present invention is an arrangement structure of a starter motor to be mounted on an engine of an all-terrain vehicle characterized in that the starter motor is arranged in front the vehicle with respect to the vertical line including a center point of a crankshaft of the engine and downwardly of a horizontal line including the center point of the crankshaft of the engine within an area upwardly of a horizontal line including a lowermost portion of the crankcase of the engine, and a lowermost portion of the starter motor is arranged close to the horizontal line including the lowermost portion of the crankcase.

In this arrangement, since the starter motor is arranged in the above-described area of the engine, the minimum road clearance of the all-terrain vehicle can be maintained at a sufficient height, the position of the center of gravity of the engine can be shifted slightly toward the front and lowered.

In this case, a structure in which the engine includes a cam for driving an air-intake valve and an exhaust valve, a camshaft of the cam is connected to a crankshaft via a chain, a tensioner lifter for providing a tension to the chain is provided, and the starter motor is arranged on the opposite side of the tensioner lifter with respect to the center of a cylinder bore of the engine is also applicable. Alternatively, a structure in which a gear transmission mechanism for transmitting a rotational force of the starter motor to the crankshaft is provided, and the gear transmission mechanism is arranged on a front portion of the crankcase may be applicable. It is preferable that there is no component arranged forwardly and downwardly of the starter motor.

In the present invention, the position of the center of gravity of the engine can be shifted slightly toward the front and lowered while keeping a sufficient minimum road clearance, so that a lower center of gravity and a suitable weight distribution of a vehicle are achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
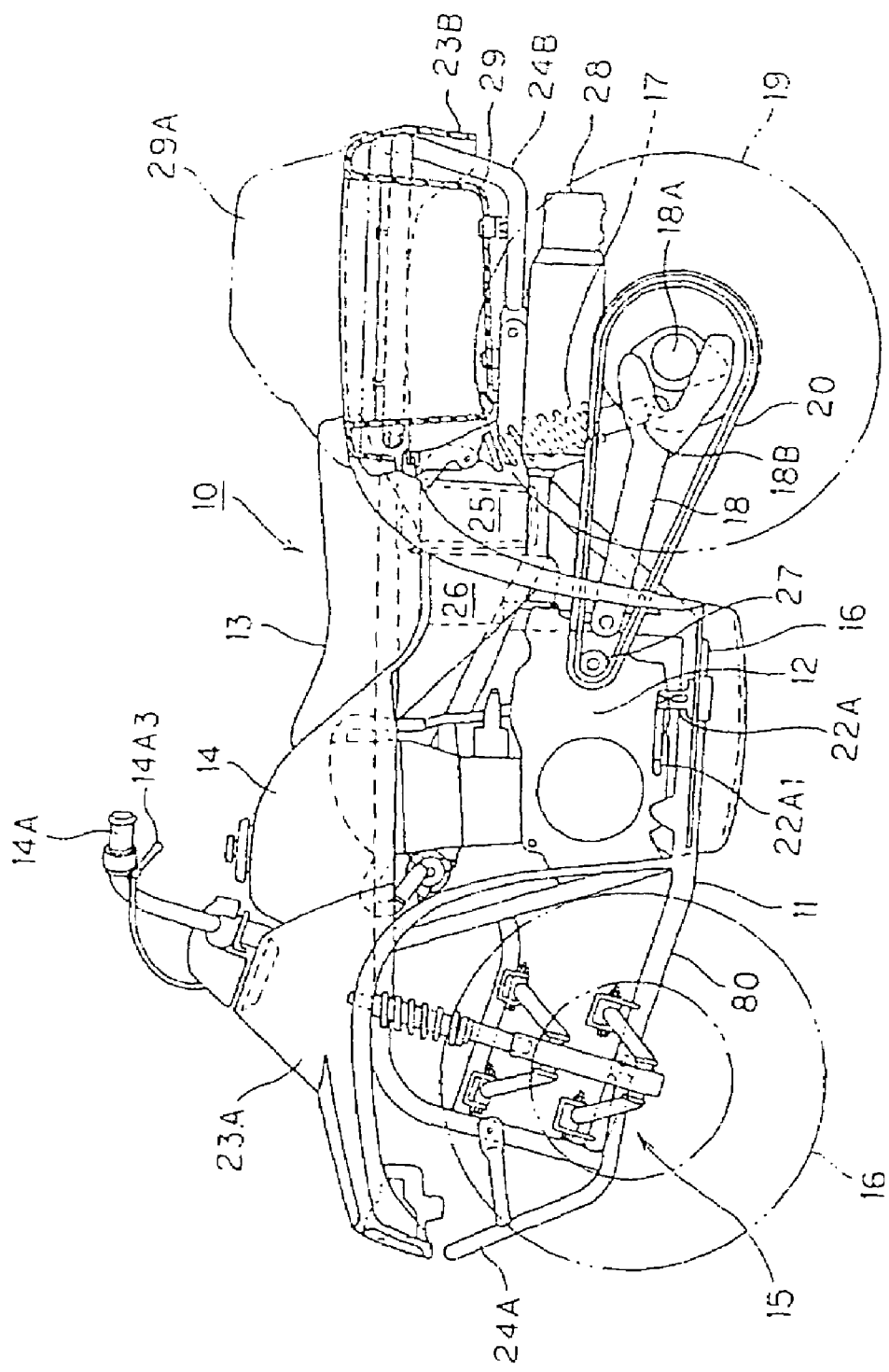
FIG. 1 is a side view of an ATV according to an embodiment of the present invention.
Figure 2:
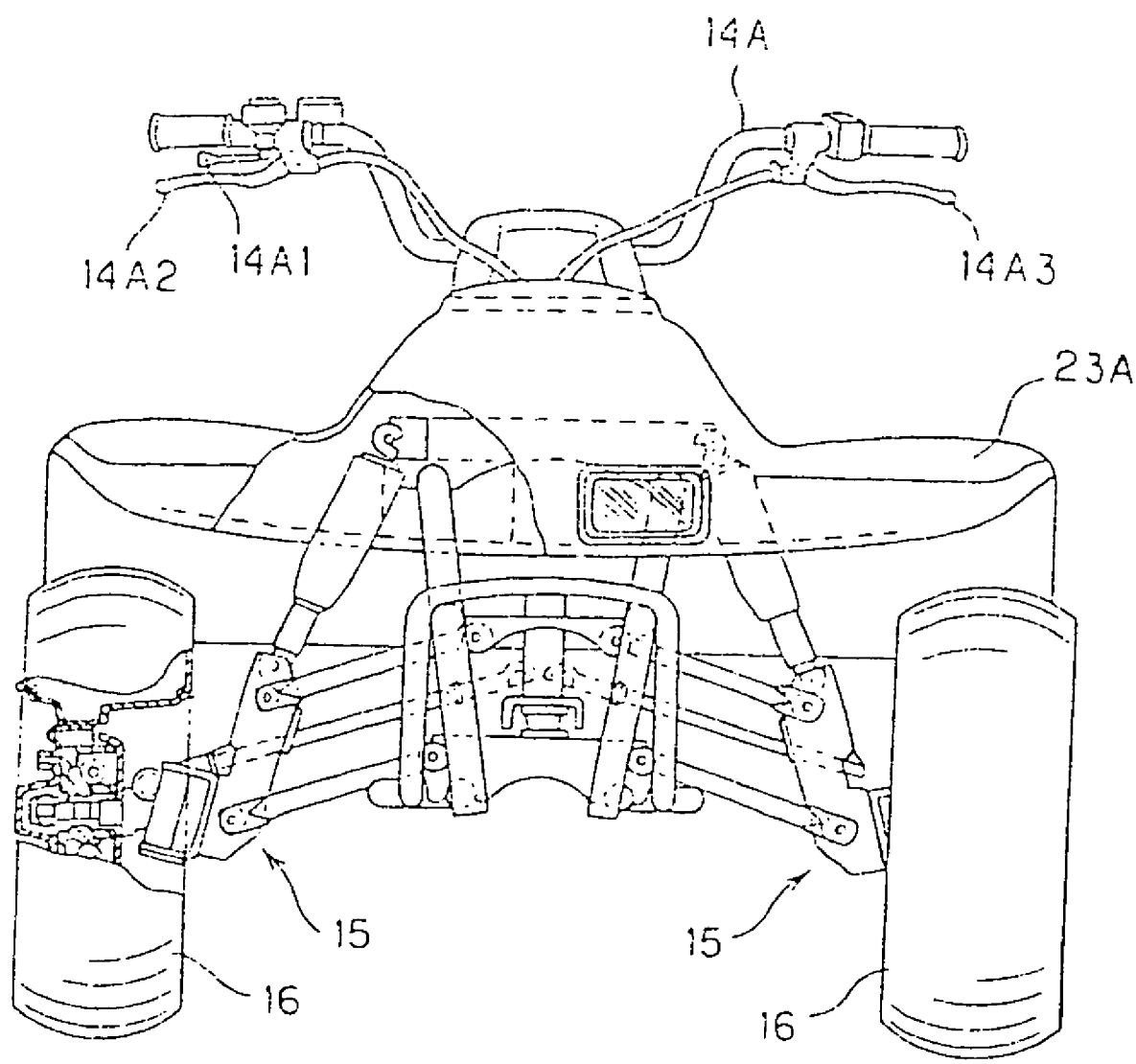
FIG. 2 is a front view of the ATV.
Figure 3:
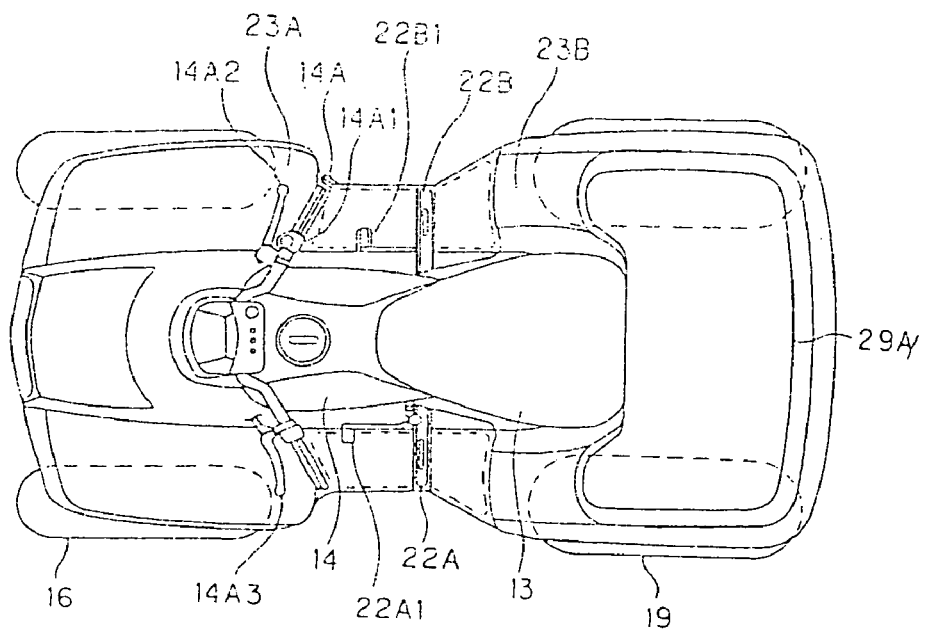
FIG. 3 is a top view of the ATV.
Figure 4:
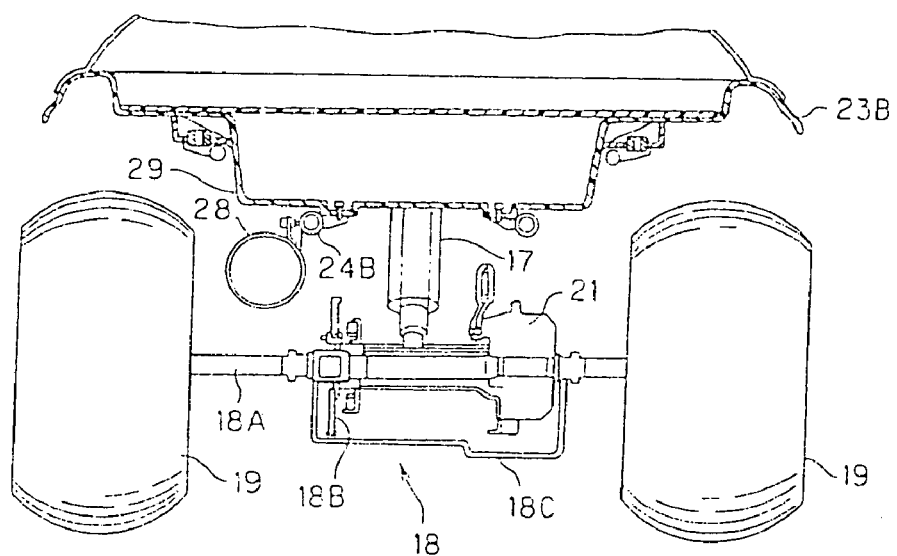
FIG. 4 is a back view of the ATV.

FIG. 1 is a side view of an ATV according to an embodiment of the present invention. FIG. 2, FIG. 3 and FIG. 4 are a front view, a top view, and a back view of the ATV respectively.

The ATV 10 is a four-wheel drive vehicle categorized in an ATV (All Terrain Vehicle), which is suitable for agriculture, cattle breeding, hunting, transportation for security monitoring, or leisure. The ATV 10 includes a vehicle frame 11. An engine 12 is supported at the center of the vehicle frame 11, a saddle-type seat 13 is supported above the engine 12, a fuel tank 14 is supported in front of the saddle-type seat 13, and a bar-shaped handle 14A is supported in front thereof. The bar-shaped handle 14A is provided with an accelerator lever 14A1, a brake lever 14A2, and a clutch lever 14A3 mounted thereon.

As shown in FIG. 2, a front wheel 16 is rotatably supported on the vehicle frame 11 via a pair of left and right suspension mechanisms 15. As shown in FIG. 4, a rear swing arm assembly 18 is supported at the rear center of the vehicle frame 11 via a suspension mechanism 17, and a rear wheel 19 is supported by a rear wheel shaft 18A of the rear swing arm assembly 18. A sprocket 18B is fixed to the rear wheel shaft 18A, and as shown in FIG. 1, a drive chain 20 is wound between the sprocket 18B and a final output shaft 27 of the engine 12. A brake mechanism 21 is arranged on the rear wheel shaft 18A. The sprocket 18B and a guard member 18C for protecting the brake mechanism 21 are mounted to the rear swing arm assembly 18.

As shown in FIG. 3, foot rests 22A, 22B for placing the feet are disposed on the left and right sides of the vehicle frame 11, and the foot rests 22A, 22B are positioned between the front wheel 16 and the rear wheel 19. As shown in FIG. 1, the one foot rest 22A is provided with a change pedal 22A1 for switching a speed change ratio of a gear speed change mechanism, described later, so as to be capable of pivotal movement, and the other foot rest 22B is provided with a brake pedal 22B1 for operating the brake mechanism 21 described above so as to be capable of pivotal movement. In addition as shown in FIG. 1 to FIG. 4, the vehicle frame 11 is provided with a front fender 23A for covering the front wheel 16, a rear fender 23B for covering the rear wheel 19, a front guard 24A, a rear guard 24B, a battery 25, an air cleaner 26, and so on mounted thereto. The rear guard 24B supports an exhaust muffler 28, and supports a storage case 29 having an openable and closable lid 29A.

Figure 5:
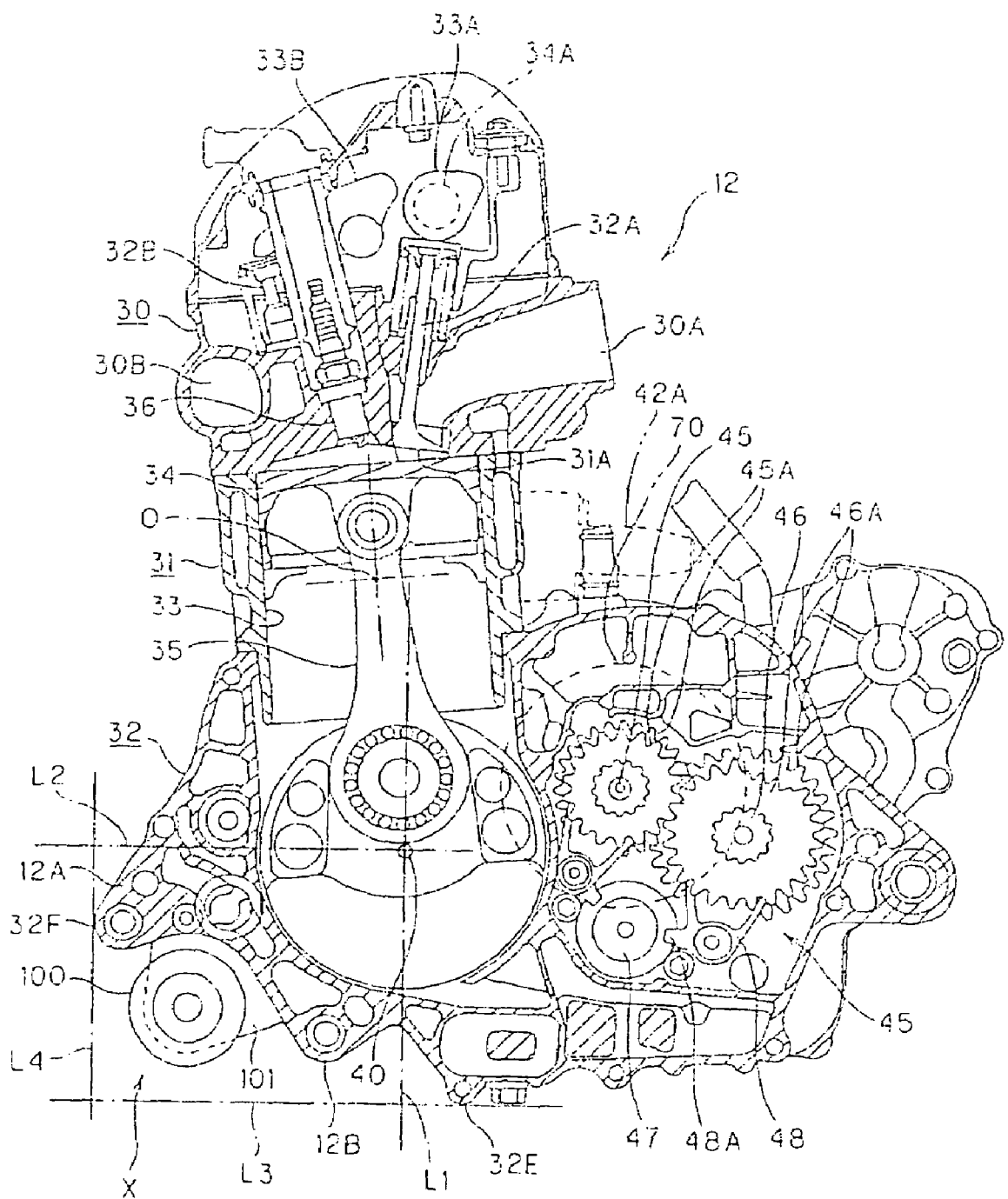
FIG. 5 is a cross-sectional view of an engine.

FIG. 5 is a cross-sectional view of the engine 12 according to the present embodiment. The engine 12 is a four-cycle engine, and includes a cylinder head 30, a cylinder block 31, and a crankcase 32. The cylinder block 31 is formed with a cylinder 33, and the cylinder 33 is provided with a piston 34 so as to be capable of sliding movement. The piston 34 is connected to a crankshaft 40 via a connecting rod 35, and the crankshaft 40 is journaled by the crankcase 32.

The cylinder head 30 is provided with an air-intake channel 30A and an exhaust channel 30B, and the respective channels include an air-intake valve 32A and an exhaust valve 32B. These valve bodies are configured to be capable of opening and closing an air-intake port 31A and an exhaust port (not shown) in communication with the cylinder 33. The air-intake valve 32A moves in the vertical direction to open and close the air-intake port 31A according to the cam profile of a cam 33A, while the exhaust valve 32B moves in the vertical direction to open and close the exhaust port (not shown) via a rocker arm 33B driven by the cam 33A.

Figure 6:
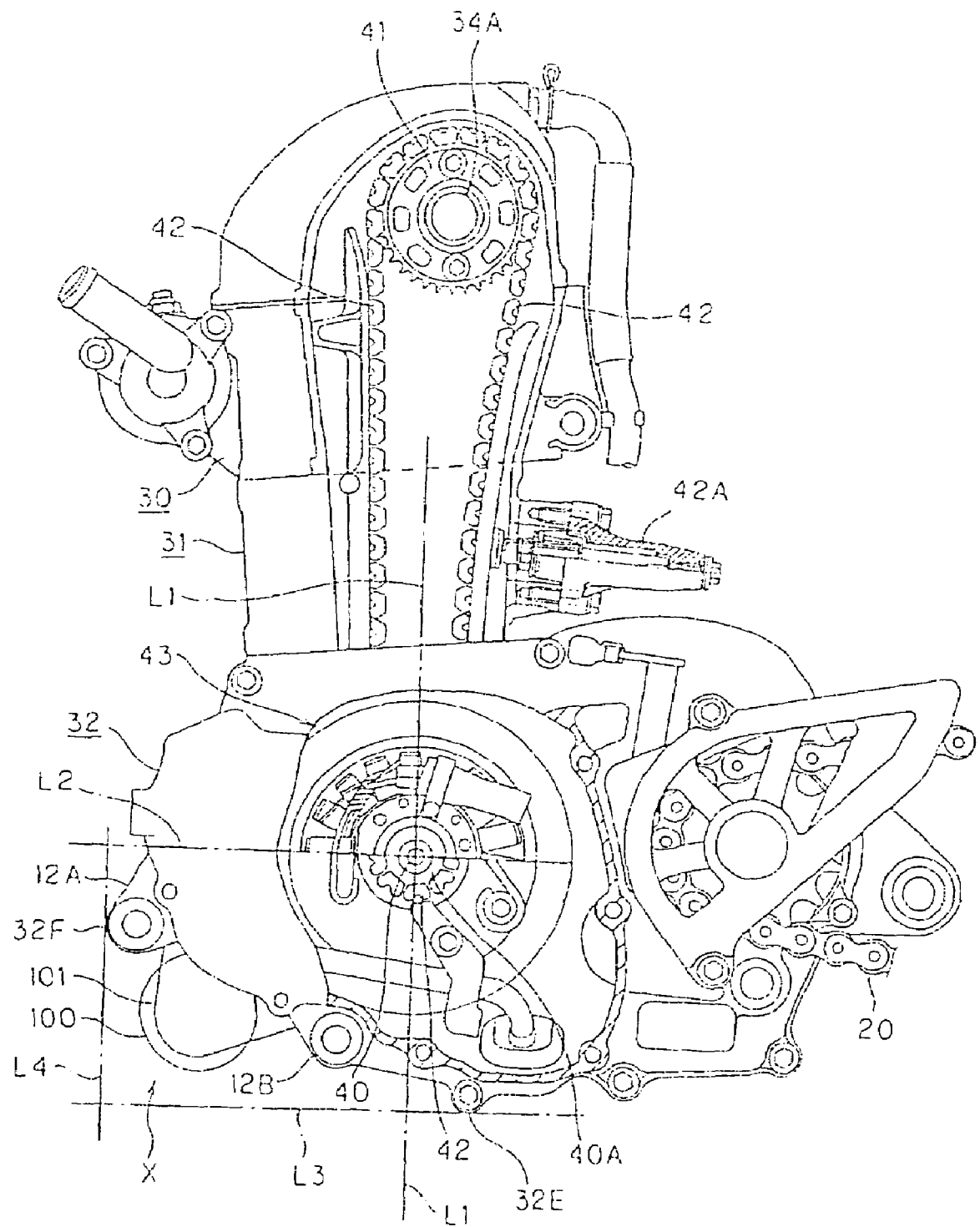
FIG. 6 is a side view, partly in cross-section, of the engine.

In other words, as shown in FIG. 6, a sprocket 41 is provided at the shaft end of a camshaft 34A which supports the cam 33A, and a chain 42 is wound between the sprocket 41 and a sprocket 40A fixed to the shaft end of the crankshaft 40. The chain 42 is provided with a tension via a tensioner lifter 42A.

Then, the rotational force of the crankshaft 40 is transmitted to the camshaft 34A via the chain 42, whereby the cam 33A and the locker arm 33B rotate or pivot, and the air-intake valve 32A and the exhaust valve 32B move in the vertical direction, so that the air-intake and exhaust port are opened at a suitable timing according to the rotation of the crankshaft 40.

As shown in FIG. 5, an ignition plug 36 is disposed on the cylinder head 30, and a throttle body and a carburetor, not shown, are connected to the air-intake channel 30A. Combustion air is supplied via the throttle body and fuel to be mixed with combustion air at a suitable mixture ratio is supplied via the carburetor. Air-fuel mixture generated by the combustion air and the fuel being mixed is taken into the cylinder 33, and then ignited by the ignition plug 36, whereby an explosive power generated by ignition moves the piston 34 in the vertical direction to rotate the crankshaft 40.

The shaft end of the crankshaft 40 is coaxially provided with an ACG (power generator) 43 as shown in FIG. 6. The ACG 43 generates power according to the rotation of the crankshaft 40, and the power is supplied to electric equipment (not shown) such as ECU (Electric Control Unit) of the vehicle 10 and the like, and is charged in a battery (not shown).

Figure 7:
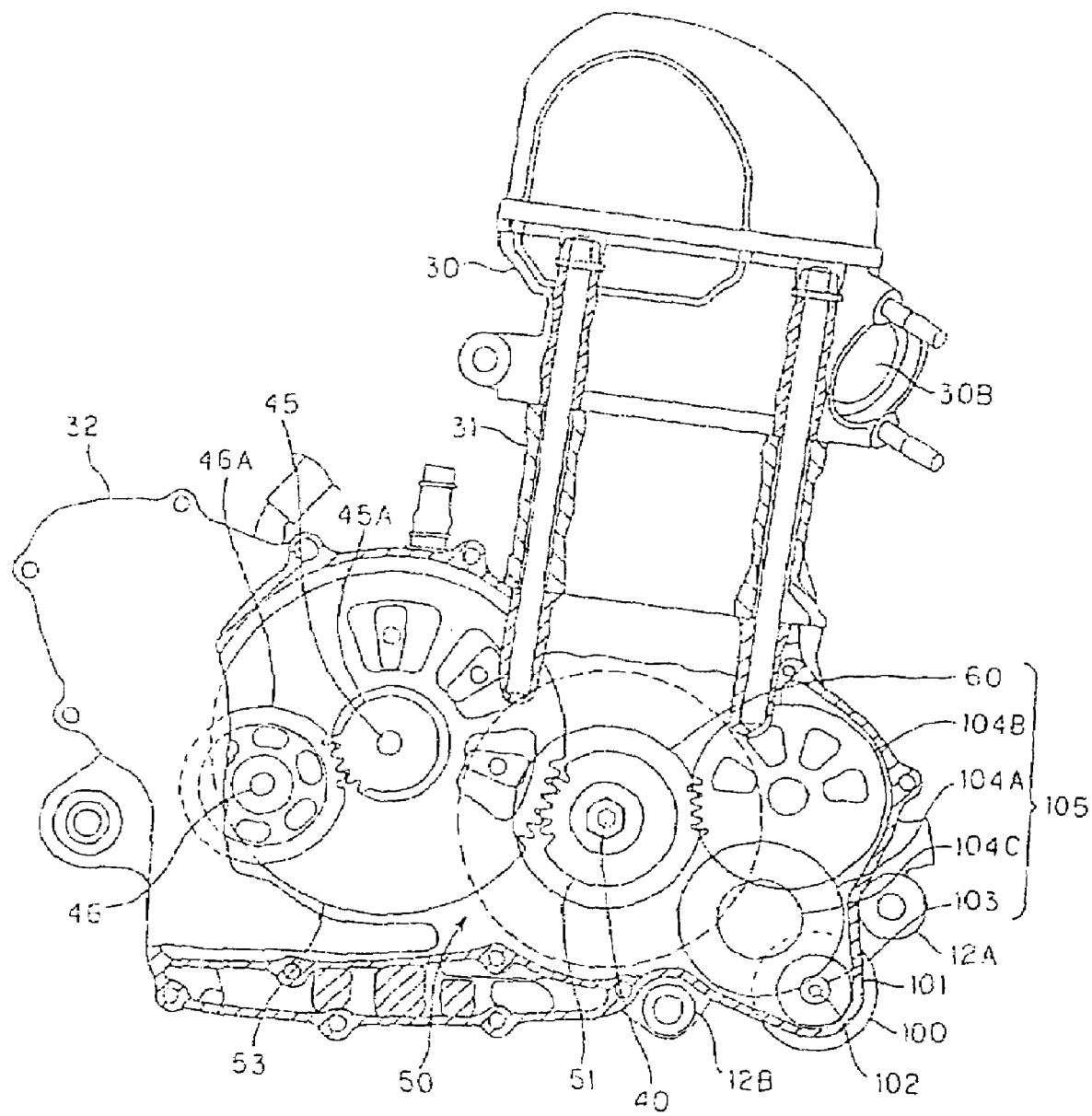
FIG. 7 is a side view, partly in cross-section, of the engine.

In addition to the ACG 43, a start clutch 50 including a centrifugal clutch mechanism and a starting gear 60 are coaxially disposed on the crankshaft 40 as shown in FIG. 7. Although not shown, the start clutch 50 mainly includes a clutch inner being connected to the crankshaft 40 and having a clutch shoe, and a clutch outer for connecting the clutch by a frictional force generated when the clutch shoe of the clutch inner is pressed. When the crankshaft 40 rotates, the clutch inner always rotates. When it is rotating at the number of revolution as low as idling, the clutch shoe does not come into press contact with the clutch outer, and hence the clutch inner runs idle. On the other hand, when the number of revolution of the crankshaft 40 exceeds a predetermined value, the clutch shoe of the clutch inner is pressed against the clutch outer by its centrifugal force and hence the clutch is connected.

A primary drive gear 51 is coaxially connected to the clutch outer of the start clutch 50, and when the clutch is connected, the rotational force of the crankshaft 40 is transmitted to the primary drive gear 5 1 via the start clutch 50.

A primary driven gear 53 engages the primary drive gear 51, and the primary driven gear 53 is disposed coaxially with a main shaft 45 which constitutes part of a constant-mesh gear speed change device described later.

In addition to the start clutch 50, the engine 12 includes a speed-change clutch 70 having a number of frictional plates (not shown) as shown in FIG. 5, and the speed-change clutch 70 is disposed coaxially with the main shaft 45.

The speed-change clutch 70 includes a clutch outer which rotates integrally with the primary driven gear 53 (FIG. 7), a clutch inner rotating integrally with the main shaft 45, the plurality of frictional plates disposed between the clutch outer and the clutch inner, and a clutch piston for pressing the frictional plates, although not shown, respectively. The speed-change clutch 70 moves the clutch piston to connect the clutch by bringing the clutch outer and the clutch inner into press contact with each other via the frictional plates.

In this arrangement, when the start clutch 50 is connected, the rotational force of the crankshaft 40 is transmitted to the primary drive gear 51 and the primary driven gear 53, and then is transmitted to the clutch outer of the speed-change clutch 70 which is connected integrally with the driven gear 53. In this state, if the speed change clutch 70 is not connected, the clutch outer of the speed-change clutch 70 runs idle, and the rotational force thereof is not transmitted to the main shaft 45. In contrast, when the start clutch 50 is connected, and then the speed-change clutch 70 is connected, the rotational force of the crankshaft 40 is transmitted to the main shaft 45 via the primary drive gear 51, the primary driven gear 53, and the speed-change clutch 70.

In other words, in addition to the crankshaft 40 and the main shaft 45, a counter shaft 46, a shift drum 47, and a shift fork 48 are supported in the crankcase 32 as shown in FIG. 5. These constitute a constant-mesh gear speed change device, and the direction of travel and the speed change ratio are switched among five gears for forward movement and one gear for reverse movement.

In other words, a plurality of gears 45A are connected on the shaft of the main shaft 45, and a plurality of gears 46A engaging the gear 45A of the main shaft 45 are connected on the shaft of the counter shaft 46. Then, by selecting arbitrary gears 45A, 46A and engaging the same with each other, for example, speed change ratios such as a first speed, a second speed and a third speed are defined, and the rotational force of the main shaft 45 is changed in speed by the gears 45A, 46A and transmitted to the counter shaft 46 according to the defined speed change ratio, then transmitted to a final output shaft 27 connected to the counter shaft 46 via the gear or the like, and then outputted and transmitted to the rear wheel 19 from the final output shaft 27 via the drive chain 20 as a power force of the engine 12 as shown in FIG. 1.

Although not shown, the gear speed change devices 45-48 are provided with a reverse movement speed change gear, and when the reverse movement is selected, the main shaft 45 and the counter shaft 46 are connected via the reverse movement speed change gear. In this arrangement the rotational force transmitted to the main shaft 45 via two clutch connection is shifted to the reverse movement gear, then transmitted to the final output shaft 27 (FIG. 1) via the counter shaft 46, and then transmitted to the rear wheel 19 from the final output shaft 27 via the drive chain 20 as a power force of the engine 12.

Describing the forward movement speed change operation, connection of the speed-change clutch 70 is released by the operation of the clutch lever 14A3 mounted to the bar-shaped handle 14A, and transmission of power to the main shaft 45 is disconnected.

Then, in the state in which power transmission to the main shaft 45 is disconnected, the change pedal 22A1 (FIG. 1) mounted to the foot rest 22A is pivoted. The change pedal 22A1 is connected to the shift drum 47, and when the change pedal 22A1 is pivoted, the shift drum 47 rotates, and the rotation moves a shift pin 48A engaged with a helical groove (not shown) of the shift drum 47 in the axial direction. The shift pin 48A is integral with the shift fork 48, and when the shift pin 48A moves in the axial direction, the shift fork 48 slides in the axial direction, and the shift fork 48 moves any one of the gears 46A on the counter shaft 46 in the axial direction, whereby the gear 46A and any one of the gears 45A on the main shaft 45 are engaged.

Figure 8:
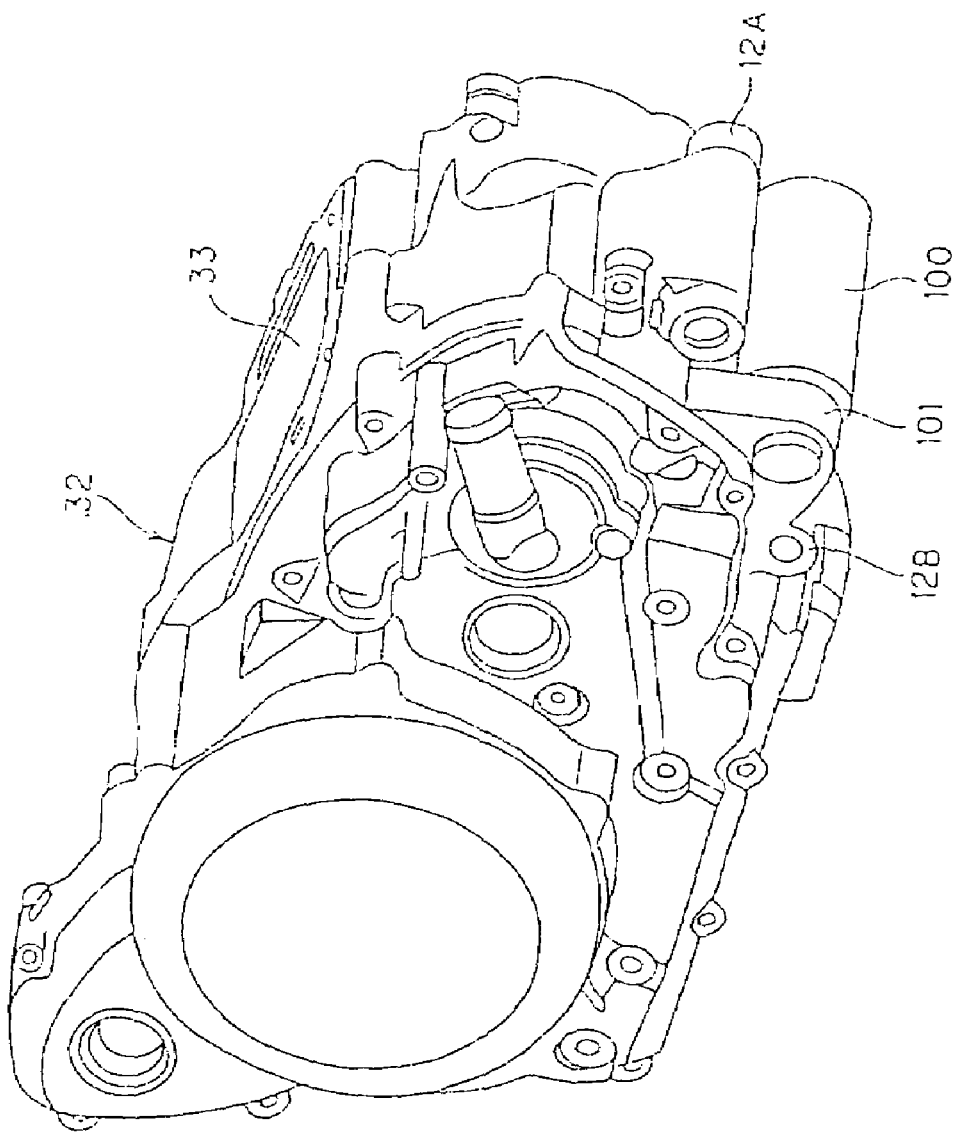
FIG. 8 is a perspective view of a crankcase.

In this embodiment, as shown in FIG. 5 to FIG. 7, the engine 12 is provided with a starter motor 100 for starting the engine mounted thereon. The engine 12 is provided with the crankcase 32 as shown in FIG. 8, and the crankcase 32 is integrally provided with a motor mount 101 formed by casting at the front part thereof. The starter motor 100 is cantilevered by the motor mount 101. The crankcase 32 includes a front engine mount 12A for fixing the front side of the engine 12 to the vehicle frame 11, and a lower engine mount 12B for fixing the lower side of the engine 12 to the vehicle frame 11 both molded integrally by casting, and the motor mount 101 described above is integrally molded between the front engine mount 12A and the lower engine mount 12B.

The motor mount 101 is disposed at a position slightly shifted toward one side surface of the crankcase 32 in the area between the front engine mount 12A and the lower engine mount 12B, and is formed into a shape projecting obliquely forward.

In this structure, as shown in FIG. 5, the starter motor 100 is disposed in a rectangular area X. The area X is an area in the front side of the vehicle with respect to a vertical line L1 including the center point of the crankshaft 40, on the lower side of a horizontal line L2 including the center point, on the upper side of a horizontal line L3 including a lowermost portion 32E of the crankcase 32, and the rear side of a vertical line L4 including a front most portion 32F of the crankcase 32.

The starter motor 100 is disposed on the opposite side of the tensioner lifter 42A with respect to a center O of the cylinder bore of the engine 12.

The motor mount 101 is, as shown in FIG. 7, hollow in the interior thereof, and a pinion gear 103 fixed to a motor shaft 102 of the starter motor 100 is disposed therein. A transmission gear 104A engages the pinion gear 103, and a transmission gear 104B engages a small gear 104C which is integral with the transmission gear 104A, and the transmission gear 104B engages with the starting gear 60 connected to the crankshaft 40. The starting gear 60 is connected to the crankshaft 40 via a one-way clutch (not shown). The gear train described above constitutes a transmission mechanism 105 for transmitting a rotational force of the starter motor 100 to the crankshaft 40. The one-way clutch (not shown) is a clutch which enables transmission of rotational force of the starting gear 60 to the crankshaft 40 as long as the number of revolution of the starting gear 60 exceeds the number of revolution of the crankshaft 40.

In this structure, when the starter motor 100 is started when starting the engine 12, the pinion gear 103 rotates, then the starting gear 60 rotates via the transmission gear 104A, the small gear 104C and the transmission gear 104B, and hence the crankshaft 40 engaged with the starting gear 60 via the one-way clutch (not shown) is driven. At this time, ignition control of the ignition plug 36 is performed by the ECU, not shown, whereby the engine 12 is started.

When the engine 12 is started, the clutch connection of the start clutch 50 is released, and the power is not transmitted from the crankshaft 40 to the primary drive gear 51.

In this embodiment, since the starter motor 100 is arranged within the area X, and the transmission mechanism 105 including a heavy gear mechanism for connecting the starter motor 100 and the crankshaft 40 is disposed at the front part of the engine 12, the position of the center of gravity of the engine 12 can be shifted slightly toward the front, and lowered, whereby the adjustment of the position of the center of gravity of the engine 12 and the suitable weight distribution can easily be achieved.

In the ATV 10, it is required to secure the minimum road clearance for travel sufficiently. In this embodiment, since the starter motor 100 is disposed near the horizontal line L3 including the lowermost portion 32E of the crankcase 32, and hence no other component is arranged below the starter motor 100, the additional members do not project downwardly of the starter motor 100, and hence the minimum road clearance for the ATV 10 can be secured sufficiently. Furthermore, the starter motor 100 is arranged rearwardly of the vertical line L4 including the frontmost portion 32F of the crankcase 32, and hence no other component is arranged in front of the starter motor 100, whereby no extra member projects forwardly from the starter motor 100.

In the ATV 10 of this type, as described above, there may be a case in which the tensioner lifter 42A for providing the tension to the chain 42 for driving the camshaft 34A for supporting the cam 33A is provided. In this case, the tensioner lifter 42A is generally arranged rearwardly of the engine 12. Since the tensioner lifter 42A is heavy, in this embodiment, the starter motor 100 is placed on the opposite side of the tensioner lifter 42A with respect to the center O of the cylinder bore of the engine 12. According to this arrangement, improvement of the suitable position of the center of gravity of the ATV 10 is achieved.

Figure 9:
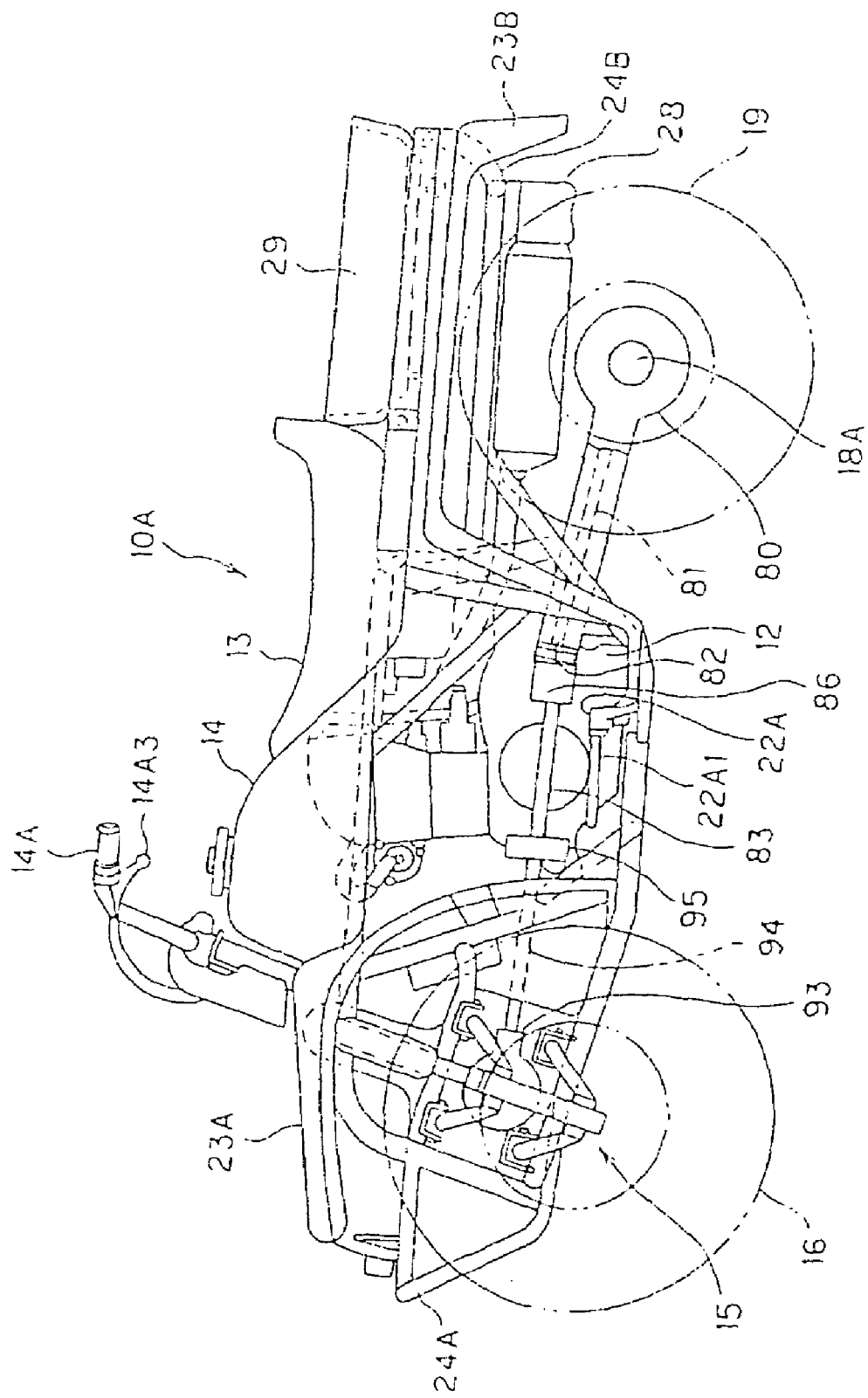
FIG. 9 is a side view of an ATV according to another embodiment of the present invention.
Figure 10:
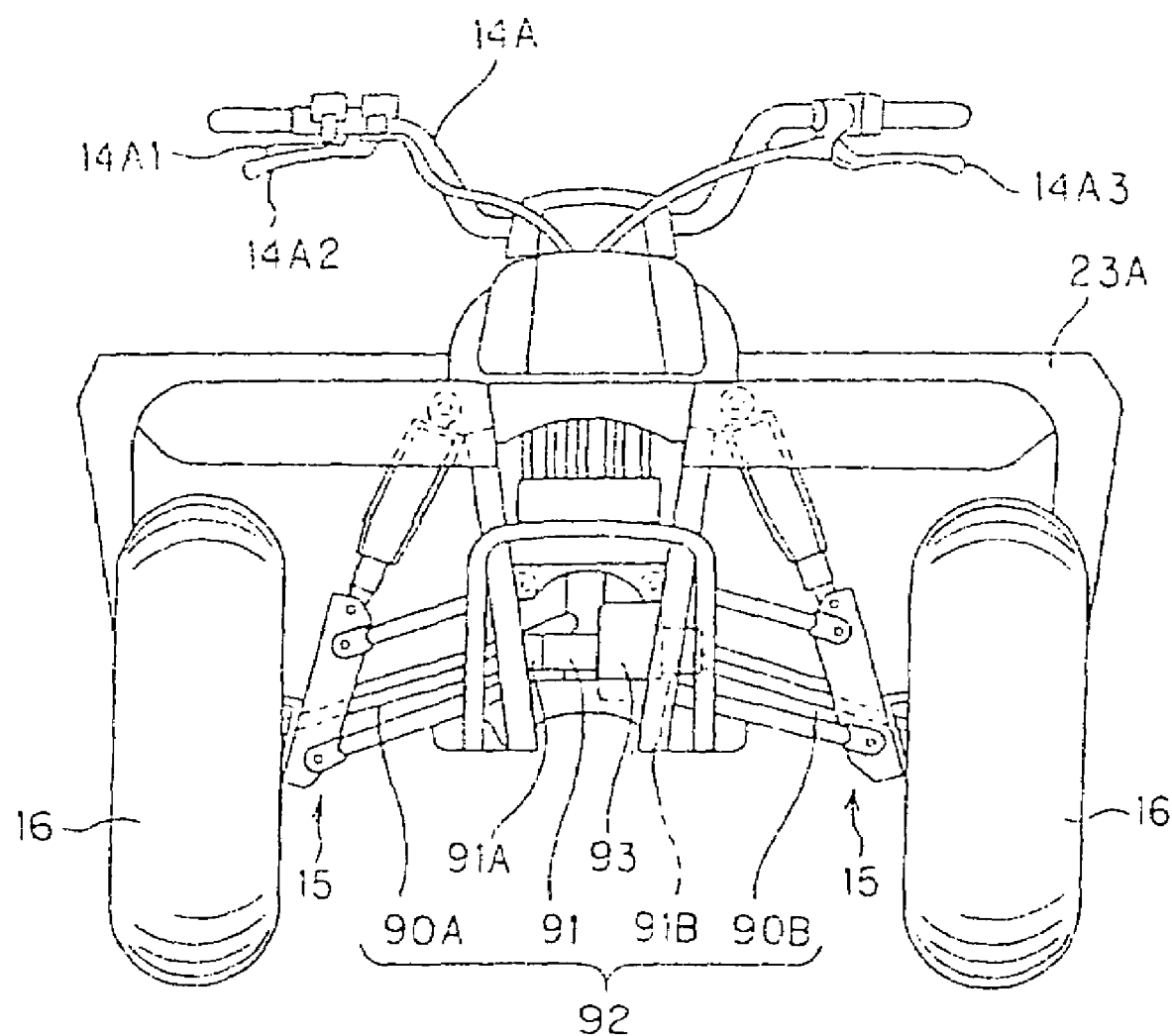
FIG. 10 is a front view of the ATV according to another embodiment.

FIG. 9 and FIG. 10 show another embodiment. An ATV 10A has substantially the same structure as the aforementioned ATV 10 except for the fact that is of a four-wheel driven system. Hereinafter, the same structures as the aforementioned embodiment are represented by the same reference numerals, and detailed description will be omitted. The ATV 10A includes the vehicle frame 11, the engine 12 is supported by the vehicle frame 11 at the center portion thereof, and the saddle-type seat 13 is supported above the engine 12, the fuel tank 14 is supported in front of the saddle-type seat 13, and the bar-shaped handle 14A is supported in front thereof. As shown in FIG. 10, the bar-shaped handle 14A is provided with the accelerator lever 14A1, the brake lever 14A2 and the clutch lever 14A3, mounted thereon.

The front wheel 16 is rotatably supported by vehicle frame 11 via the pair of the left and right suspension mechanism 15, the rear swing arm assembly 18 is supported at the rear of the vehicle frame 11 via the suspension mechanism 17 although not shown, and the rear wheel 19 is supported by the rear wheel shaft 18A of the rear swing arm assembly 18. In this ATV 10A, a drive shaft 83 is connected to the final output shaft of the engine 12 via a gear box 86 so as to be capable of transmitting the power as shown in FIG. 9. Then, a propeller shaft 81 is connected to the rear end of the drive shaft 83 via a universal joint 82, and the rear wheel shaft 18A is connected to the propeller shaft 81 via a final speed reducer 80. A propeller shaft 94 is connected to the front end of the drive shaft 83 via a universal joint 95, and a front wheel shaft 92 is connected to the propeller shaft 94 via a final speed reducer 93. The front wheel shaft 92 includes first front wheel shafts 90A, 90B, and a second front wheel shaft 91 as shown in FIG. 10. Reference numerals 91A and 91B designate universal joints, respectively.

The vehicle frame 11 is provided with the foot rest 22A for placing feet and the foot rest 22A is located between the front wheel 16 and the rear wheel 19.

The foot rest 22A is provide with the change pedal 22A1 for switching the speed change ratio of the gear speed change mechanism of the engine 12 so as to be pivotable, and then the vehicle frame 11 is provided with the front fender 23A for covering the front wheel 16, the rear fender 23B for covering the rear wheel 19, the front guard 24A and the rear guard 24B. The rear guard 24B supports the exhaust muffler 28 and the storage case 29.

In this ATV 10A, with the structure such that the starter motor 100 is disposed within the area X under substantially the same conditions as the aforementioned embodiment, and the transmission mechanism 105 including the heavy gear mechanism for connecting the starter motor 100 and the crankshaft 40 is disposed in the front portion of the engine 12, the position of the center of gravity of the engine 12 can be shifted toward the front and lowered, whereby the suitable adjustment of the position of the center of gravity of the engine 12 and the adequate weight distribution can be achieved. In the ATV 10A, it is required to secure a sufficient minimum road clearance. In this embodiment, by arranging the starter motor 100 near the horizontal line L3 including the lowermost portion 32E of the crankcase 32 under substantially the same conditions as in the aforementioned embodiment, the additional members do not project downwardly therefrom, and hence a sufficient minimum road clearance of the ATV 10A can be secured.

Although the embodiment of the arrangement structure of the starter motor according to the present invention has been described, the present invention is not limited thereto, and various modifications may be made.

Although the example in which connection between the crankshaft 40 and the starter motor 100 is disconnected via the one-way clutch is shown in the aforementioned embodiment, it is apparently possible to apply an electromagnetic pushing mechanism which moves the pinion gear 103 of the starter motor 100 between the position of engagement with the transmission gear 104A and the position of non-engagement therewith using, for example, a magnet switch, instead of the one-way clutch.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement structure of a starter motor to be mounted on an engine of an all-terrain vehicle,
   wherein the starter motor is arranged on a front side of the vehicle with respect to a vertical line including a center point of a crankshaft of the engine and downwardly of a horizontal line including the center point of the crankshaft of the engine within an area upwardly of a horizontal line including a lowermost portion of a crankcase of the engine, and a lowermost portion of the starter motor is arranged close to the horizontal line including the lowermost portion of the crankcase,
   wherein the crankcase includes a front engine mount which extends forwardly of the starter motor.

2. The arrangement structure of a starter motor according to claim 1, wherein the engine comprises:
   a cam for driving an air-intake valve and an exhaust valve,
   a camshaft of the cam is connected to the crankshaft via a chain,
   a tensioner lifter for providing a tension to the chain,
   wherein the starter motor is arranged on an opposite side of the tensioner lifter with respect to a center of a cylinder bore of the engine.

3. The arrangement structure of a starter motor according to claim 1,
   further comprising a gear transmission mechanism for transmitting a rotational force of the starter motor to the crankshaft, and the gear transmission mechanism being arranged on a front portion of the crankcase.

4. The arrangement structure of a starter motor according to claim 2,
further comprising a gear transmission mechanism for transmitting a rotational force of the starter motor to the crankshaft, and the gear transmission mechanism being arranged on a front portion of the crankcase.

5. The arrangement structure of a starter motor according to claim 1,
wherein there is no separate component mounted on the crankcase that is arranged forwardly and downwardly of the starter motor.

6. An arrangement structure of a starter motor to be mounted on an engine of an all-terrain vehicle,
wherein the starter motor is arranged on a front side of the vehicle with respect to a vertical line including a center point of a crankshaft of the engine and downwardly of a horizontal line including the center point of the crankshaft of the engine within an area upwardly of a horizontal line including a lowermost portion of a crankcase of the engine, and a lowermost portion of the starter motor is arranged close to the horizontal line including the lowermost portion of the crankcase,
wherein there is no separate component mounted on the crankcase that is arranged forwardly and downwardly of the starter motor.

7. The arrangement structure of a starter motor according to claim 1, wherein crankcase is integrally provided with a motor mount formed at the front part thereof, and the starter motor is cantilevered by the motor mount.

8. The arrangement structure of a starter motor according to claim 7, wherein a pinion gear and motor shaft of the starter motor are disposed in a hollow interior portion of the motor mount.

9. The arrangement structure of a starter motor according to claim 7, wherein the motor mount is disposed at a position slightly shifted toward one side surface of the crankcase in an area between a front engine mount and a lower engine mount, and is formed into a shape projecting obliquely forward.

10. An arrangement structure of a starter motor to be mounted on an engine of an all-terrain vehicle,
wherein the starter motor is arranged on a front side of the vehicle in an area which is disposed downwardly and forwardly with respect to a crankshaft of the engine, and
when seen in a side elevation view, the area in which the starter motor is arranged is forward with respect to a lower engine mount, lower with respect to a front engine mount, and upward with respect to a horizontal line including a lowermost portion of a crankcase of the engine,
wherein the crankcase is integrally provided with a motor mount formed at the front part thereof, and the starter motor is cantilevered by the motor mount.

11. The arrangement structure of a starter motor according to claim 10, wherein the engine comprises:
a cam for driving an air-intake valve and an exhaust valve,
a camshaft of the cam is connected to the crankshaft via a chain,
a tensioner lifter for providing a tension to the chain,
wherein the starter motor is arranged on an opposite side of the tensioner lifter with respect to a center of a cylinder bore of the engine.

12. The arrangement structure of a starter motor according to claim 10,
further comprising a gear transmission mechanism for transmitting a rotational force of the starter motor to the crankshaft, and the gear transmission mechanism being arranged on a front portion of the crankcase.

13. The arrangement structure of a starter motor according to claim 11,
further comprising a gear transmission mechanism for transmitting a rotational force of the starter motor to the crankshaft, and the gear transmission mechanism being arranged on a front portion of the crankcase.

14. The arrangement structure of a starter motor according to claim 10, wherein there is no separate component mounted on the crankcase that is arranged forwardly and downwardly of the starter motor.

15. The arrangement structure of a starter motor according to claim 11, wherein there is no separate component mounted on the crankcase that is arranged forwardly and downwardly of the starter motor.

16. The arrangement structure of a starter motor according to claim 10, wherein the crankcase includes a front engine mount which extends forwardly of the starter motor.

17. The arrangement structure of a starter motor according to claim 10, wherein a pinion gear and motor shaft of the starter motor are disposed in a hollow interior portion of the motor mount.

18. The arrangement structure of a starter motor according to claim 10, wherein the motor mount is disposed at a position slightly shifted toward one side surface of the crankcase in an area between a front engine mount and a lower engine mount, and is formed into a shape projecting obliquely forward.

* * * * *